(12) United States Patent
Choi et al.

(10) Patent No.: US 7,268,480 B2
(45) Date of Patent: Sep. 11, 2007

(54) FIELD EMISSION DEVICE, DISPLAY ADOPTING THE SAME AND METHOD OF MANUFACTURING THE SAME

(75) Inventors: Jun-Hee Choi, Suwon-si (KR); Andrei Zoulkarneev, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 362 days.

(21) Appl. No.: 11/002,242

(22) Filed: Dec. 3, 2004

(65) Prior Publication Data

US 2005/0139817 A1    Jun. 30, 2005

(30) Foreign Application Priority Data

Dec. 12, 2003    (KR) .................... 10-2003-0090556

(51) Int. Cl.
*H01J 9/12* (2006.01)
(52) U.S. Cl. .................... 313/495; 313/309; 313/311; 313/351; 445/49; 445/51
(58) Field of Classification Search ................ 313/495, 313/306
See application file for complete search history.

(56) References Cited

U.S. PATENT DOCUMENTS

| 5,920,151 | A | 7/1999 | Barton et al. | |
| 7,132,304 | B2* | 11/2006 | Choi et al. | 438/20 |
| 7,173,366 | B2* | 2/2007 | Choi et al. | 313/495 |
| 2004/0080260 | A1* | 4/2004 | Park et al. | 313/495 |

* cited by examiner

*Primary Examiner*—David Bruce
*Assistant Examiner*—Conrad R. Blease
(74) *Attorney, Agent, or Firm*—Robert E. Bushnell, Esq.

(57) ABSTRACT

A field emission device manufactured by the disclosed method and employed in a display unit includes a glass substrate, an emitter electrode formed on the glass substrate, a carbon nanotube (CNT) emitter formed on the emitter electrode, and a gate stack formed around the CNT emitter. Electron beams are extracted from the CNT emitter and the extracted electron beams are focused onto a given position. The gate stack includes a mask layer that covers the emitter electrode provided around the CNT emitter, a gate insulating layer and a gate electrode sequentially formed on the mask layer, a focus gate insulating layer having double inclined planes facing the CNT emitter on the gate electrode, and focus gate electrode coated on the focus gate insulating layer.

27 Claims, 16 Drawing Sheets

FIELD EMISSION DEVICE, DISPLAY ADOPTING THE SAME AND METHOD OF MANUFACTURING THE SAME

CLAIM OF PRIORITY

This application makes reference to, incorporates the same herein, and claims all benefits accruing under 35 U.S.C. § 119 from an application for FIELD EMISSION DEVICE, DISPLAY ADOPTING THE SAME AND METHOD OF MANUFACTURING THE SAME earlier filed in the Korean Intellectual Property Office on 12 Dec. 2003 and there duly assigned Serial No. 2003-90556.

BACKGROUND OF THE INVENTION

1. Technical Field

The present invention relates to a field emission device, a display adopting the same, and a method of manufacturing the same, and more particularly, to a field emission device which has improved focusing effect of electron beams, a display adopting the same, and a method of manufacturing the same.

2. Related Art

Display devices, which are the principal conventional information transmission media, have been typically used as monitors of PCs or TV receivers. Such display devices are largely classified into Cathode Ray Tubes (CRTs), which use high-speed emission of hot electrons, and flat panel display devices, which have been rapidly advancing. The flat panel display devices include liquid crystal display (LCD) devices, plasma display panels (PDPs), and field emission display devices (FEDs).

In the field emission display device, a strong electric field is formed between a field emitter and a gate electrode disposed on a cathode at a constant interval, so that electrons are emitted from the field emitter to impinge phosphors on an anode, thereby emitting light. The field emission display is a very thin display device, and is therefore attracting great attention in view of its thinness of several centimeters in overall thickness, a wide viewing angle, low power consumption, and a low fabrication cost.

The field emission display device utilizes substantially the same physical principle as the CRT. In other words, emissions emitted from the cathode are accelerated to collide with the anode, so that phosphors coated on the anode are excited to then emit light of a particular color. Unlike the CRT, however, the field emission display device uses a cold cathode material as an electron source.

The field emission display device includes a cathode formed on a substrate. Also, a gate electrode is formed on an insulating layer as an electron extracting electrode. A field emitter is provided within a hole through which part of the cathode is exposed.

In the field emission display device having the above-described structure, however, if trajectories of electron beams are not controlled, a desired color cannot be exactly displayed at a given pixel. Therefore, there is a need for an electron beam trajectory control technique which enables electrons emitted from a field emitter to be accurately transmitted to a desired pixel on an anode coated with a phosphor material.

With respect to an electron source having a focus gate electrode, a second insulating layer is additionally deposited over a gate electrode, and a focus gate electrode for controlling electron beam trajectories is formed thereon.

With respect to trajectories of electron beams emitted from emitters of the FED having the focus gate electrode, overfocused electrons deviate from a target phosphor layer region and excite a phosphor layer in another region, which results in deterioration of color purity. This undesirable result is caused by variation in the protruding directions of a carbon nanotube (CNT) used as an electron source.

To avoid the above-described concerns, U.S. Pat. No. 5,920,151 discloses a field emission display (FED) device having an imbedded focusing structure, which requires, however, an outgassing process for exhausting volatile gas from an organic material formed on a focus gate electrode, i.e., polyimide. This makes the disclosed FED difficult to be applied to a large-screen display field.

SUMMARY OF THE INVENTION

The present invention provides a field emission device which has an improved focusing effect of electron beams, a display adopting the same, and a method of manufacturing the same.

In an aspect of the present invention, there is provided a field emission device having a glass substrate, an emitter electrode formed on the glass substrate, a carbon nanotube (CNT) emitter formed on the emitter electrode, and a gate stack formed around the CNT emitter for extracting electron beams from the CNT emitter and focusing the extracted electron beams onto a given position. In accordance with the invention, the gate stack comprises a mask layer that covers the emitter electrode provided around the CNT emitter, a gate insulating layer and a gate electrode sequentially formed on the mask layer, a focus gate insulating layer having double inclined planes facing the CNT emitter on the gate electrode, and a focus gate electrode coated on the focus gate insulating layer.

In another aspect of the present invention, there is further provided a field emission display device having a glass substrate, an emitter electrode formed on the glass substrate, a carbon nanotube (CNT) emitter formed on the emitter electrode, a gate stack formed around the CNT emitter for extracting electron beams from the CNT emitter and focusing the extracted electron beams onto a given position, a front panel formed above the gate stack and on which information is displayed, and a phosphor layer coated on a surface of the front panel facing the CNT emitter. In accordance with the invention, the gate stack comprises a mask layer that covers the emitter electrode provided around the CNT emitter, a gate insulating layer and a gate electrode sequentially formed on the mask layer, a focus gate insulating layer having double inclined planes facing the CNT emitter on the gate electrode, and a focus gate electrode coated on the focus gate insulating layer.

In still another aspect of the present invention, there is further provided a method of manufacturing a field emission device having a glass substrate, a transparent electrode formed on the glass substrate, a carbon nanotube (CNT) emitter formed on the emitter electrode, and a gate stack formed around the CNT emitter for extracting electron beams from the CNT emitter and focusing the extracted electron beams onto a given position. In accordance with the invention, the step of forming the gate stack comprises: (1) forming a mask layer on the glass substrate to partially expose and the transparent electrode through a via hole; (2) forming a gate insulating layer filling the via hole on the mask layer; (3) forming a gate electrode on the gate insulating layer around the via hole; (4) forming a focus gate insulating layer on the gate electrode and the gate insulating layer; (5) forming a well on the focus gate insulating layer around the via hole; (6) forming a focus gate electrode on the focus gate insulating layer around the via hole; and (7) removing the focus gate insulating layer and the gate insulating layer within the gate electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
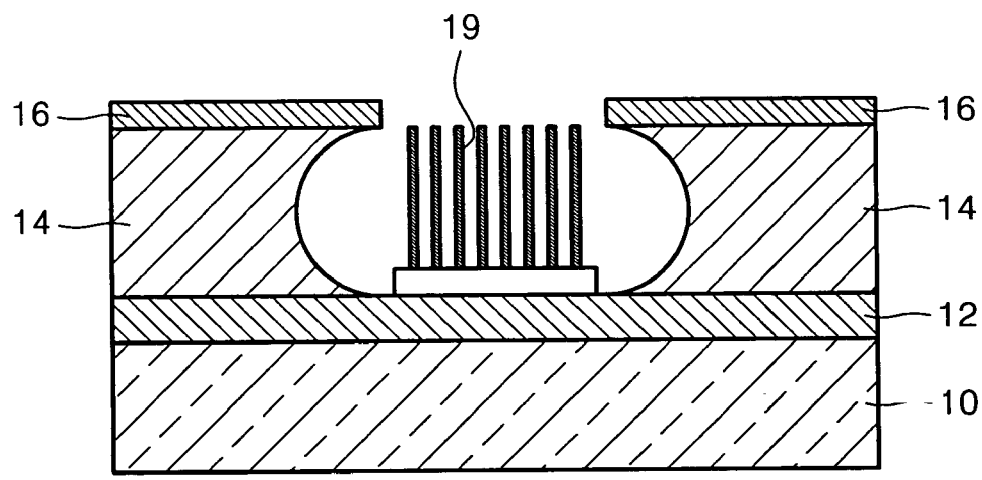
FIG. 1 is a schematic cross-sectional view of a general field emission display device (FED)

A field emission display device according to the present invention, a display device adopting the same, and a method of manufacturing the same will now be described more fully with reference to the accompanying drawings, in which preferred embodiments of the invention are shown. In the drawings, the thickness of layers, regions, etc. are exaggerated for clarity.

FIG. 1 is a schematic cross-sectional view of a general field emission display device. Referring to FIG. 1, the field emission display device includes a cathode 12 formed on a substrate 10. Also, a gate electrode 16 is formed on an insulating layer 14 as an electron extracting electrode. A field emitter 19 is provided within a hole through which part of the cathode 12 is exposed.

In the field emission display device having the above-described structure, however, if trajectories of electron beams are not controlled, a desired color cannot be exactly displayed at a given pixel. Therefore, there is a need for an electron beam trajectory control technique which enables electrons emitted from the field emitter 19 to be accurately transmitted to a desired pixel on an anode coated with a phosphor material.

Figure 2:
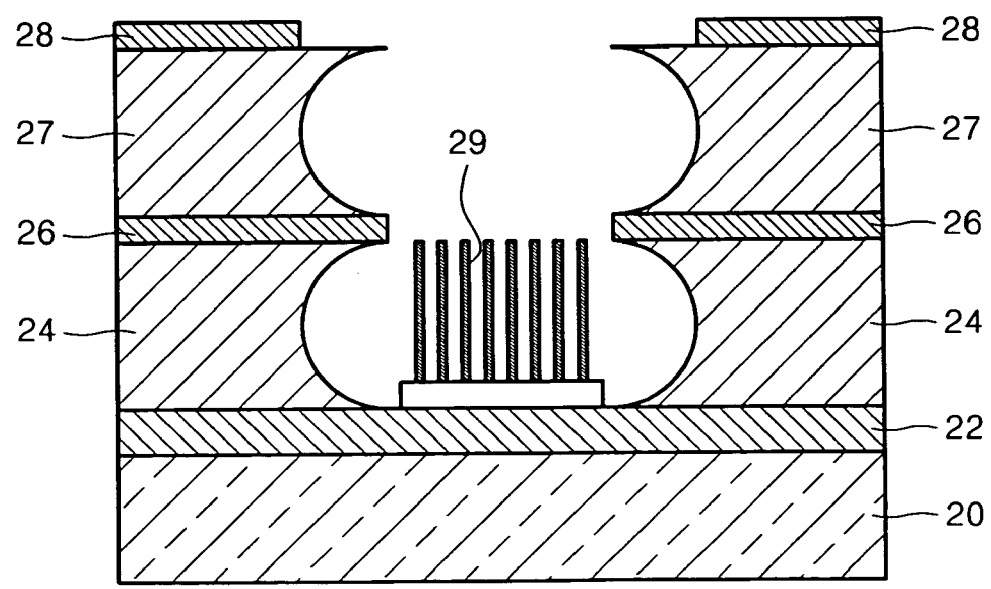
FIG. 2 is a schematic cross-sectional view of a general FED having a focus gate electrode.

FIG. 2 shows an example of an electron source having a focus gate electrode.

Referring to FIG. 2, a second insulating layer 27 is additionally deposited over a gate electrode 26 and a focus gate electrode 28 for controlling electron beam trajectories is formed thereon. In FIG. 2, reference numerals 20, 22, 24, and 29 denote a substrate, a cathode, a first insulating layer, and a field emitter, respectively.

Figure 3:
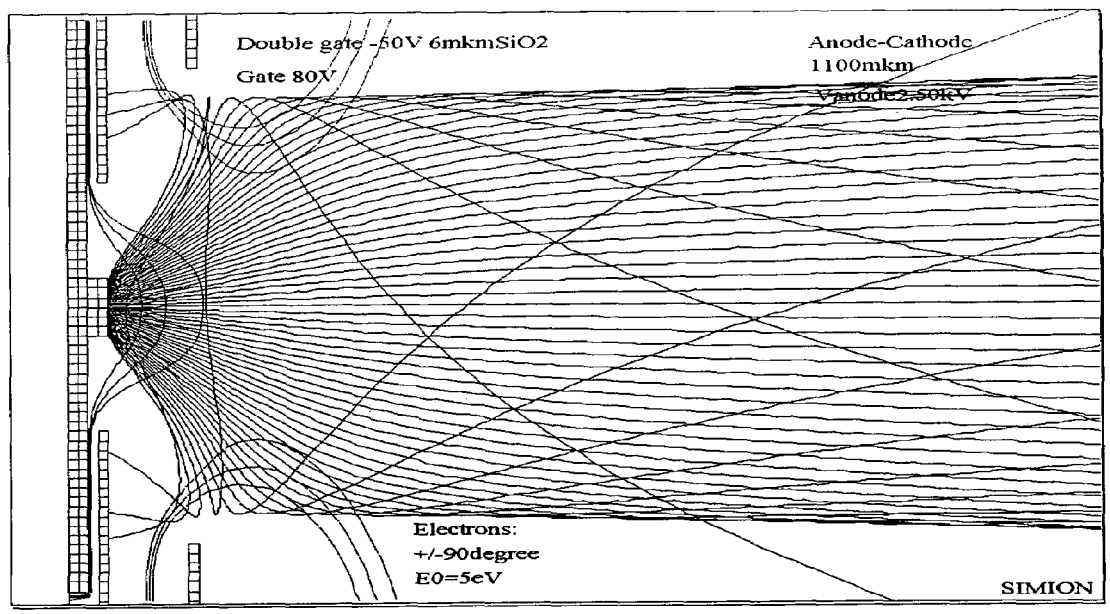
FIG. 3 shows results of a computer simulation performed with respect to trajectories of electron beams emitted from emitters of the FED having the focus gate electrode.
Figure 4:
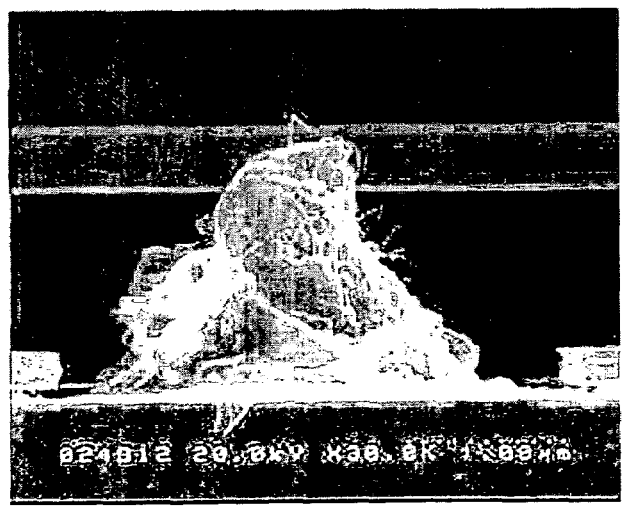
FIG. 4 is a scanning electron microscope (SEM) photo showing a general CNT emitter.

FIG. 3 shows results of a computer simulation performed with respect to trajectories of electron beams emitted from emitters of the FED having the focus gate electrode, while FIG. 4 is a scanning electron microscope (SEM) photo showing a general CNT emitter.

Referring to FIG. 3, overfocused electrons deviate from a target phosphor layer region and excite a phosphor layer in another region, which results in deterioration of color purity. This undesirable result is caused by variation in the protruding directions of a carbon nanotube (CNT) used as an electron source, as shown in FIG. 4.

Figure 5:
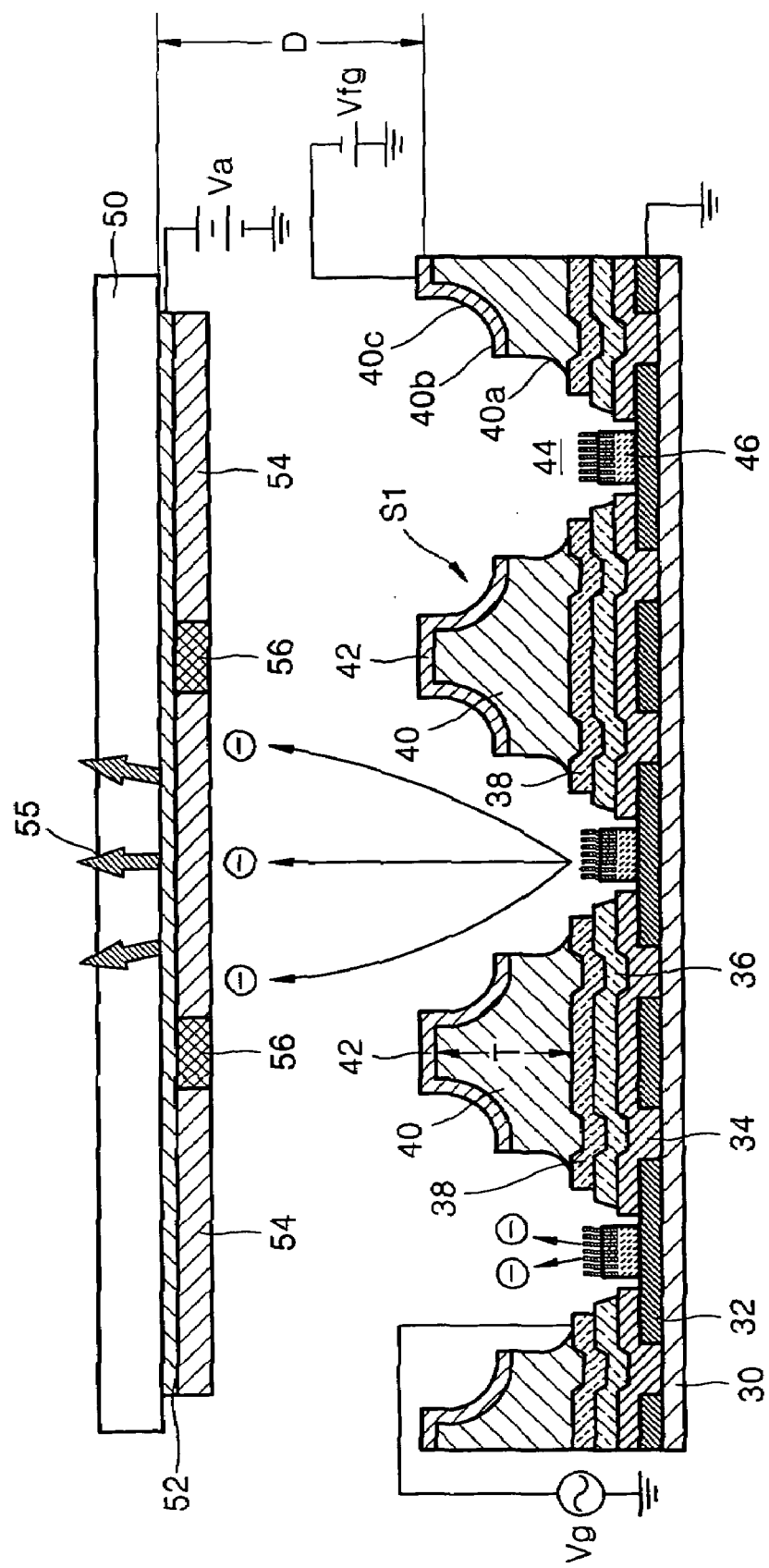
FIG. 5 is a partly cross-sectional view of a field emission display device according to an embodiment of the present invention.

FIG. 5 is a partly cross-sectional view of a field emission display device according to an embodiment of the present invention.

Referring to FIG. 5, an emitter electrode 32 is formed on a glass substrate 30. The emitter electrode 32 is preferably a transparent electrode made of indium tin oxide (ITO). A gate stack S1, which partially covers the emitter electrode 32, is formed on the glass substrate 30. A contact hole 44 is formed between the gate stacks S1 to expose the emitter electrode 32. A CNT emitter 46 is formed on the emitter electrode 32 exposed by the contact hole 44. Electrons are emitted from the CNT emitter 46. The CNT emitter 46 is in a non-contact state with respect to the gate stack S1. The gate stack S1 partially covers the transparent electrode 32 and includes a first mask layer 34 used as a mask for a back exposure, which will later be described. The first mask layer 34 is spaced apart from the CNT emitter 46. On the first mask layer 34 are sequentially stacked a gate insulating layer 36, a gate electrode 38, a focus gate insulating layer 40 and a focus gate electrode 42. The respective stacks 36, 38, 40 and 42 are tapered upward, as shown in FIG. 5. Thus, the lateral surface of the gate stack S1 is in the shape of a stepped tilted surface.

Various elements of the gate stack S1 are patterned by a back exposure method using ultraviolet light in the manufacturing process of the CNT FED shown in FIG. 5, which will later be described. Therefore, the first mask layer 34 is preferably a material layer which is transparent with respect to visible light while being opaque with respect to the ultraviolet light in view of optical properties. For example, an amorphous silicon layer may be used as the first mask layer 34.

The gate insulating layer 36 is provided for establishment of electric isolation between the gate electrode 38 and the transparent electrode 32. The gate insulating layer 36 is made of an insulating material, e.g., silicon oxide ($SiO_2$), and the thickness thereof is usually in a range of about 5 to 10 μm. The thickness of the gate insulating layer 36 may vary according to formation method and material used.

The gate electrode 38 is, preferably, formed of chrome having a thickness of about 0.25 μm. The gate electrode 38 can be made of material having different conductivity. In this case, the thickness of the gate electrode 38 may not be 0.25 μm.

The focus gate insulating layer 40 electrically insulates the gate electrode 38 from the focus gate electrode 42. Two inclined planes 40a and 40c are formed on a plane of the focus gate insulating layer 40, the plane facing the CNT emitter 46. In other words, a first inclined plane 40a connected to the gate electrode 38, a horizontal portion 40b connected to the first inclined plane 40a, and a second inclined plane 40c inclined upward from the horizontal portion 40b are formed on the plane. The inclination angle of the first inclined plane 40a is, preferably, greater than that of the second inclined plane 40c. Also, the inclined planes 40a and 40c are preferably formed in a concave shape. The horizontal portion 40b may be connected to the second inclined plane 40c, forming an inclined plane.

The focus gate insulating layer 42 may be silicon oxide ($SiO_x$) having a thickness (T) not less than 2 μm, preferably 3 μm to 15 μm. Here, the subscript value "X" is preferably smaller than 2 (X<2).

The focus gate electrode 42 is, preferably, a chromium electrode having a predetermined thickness, e.g., approximately 0.25 μm, which is formed upward from the horizontal portion 40b of the focus gate insulating layer 40. The focus gate electrode 42 can be made of different material having conductivity. In this case, the thickness of the electrode may not be 0.25 μm.

The gate electrode 38 is used to extract electron beams from the CNT emitter 46. Accordingly, a predetermined AC gate voltage Vg, e.g., +80 V, may be applied to the gate electrode 38.

Also, the focus gate electrode 42 collects the electron beams emitted from the CNT emitter 46 so as to reach a given position of the phosphor layer 54. To this end, a focus gate voltage Vfg having the same polarity as, and a lower absolute value than, gate voltage Vg, e.g., approximately −10 V, is applied to the focus gate electrode 42.

Referring to FIG. 5, a front panel 50 extends upward a predetermine distance D, e.g., 1.1 mm, and is spaced apart from the focus gate electrode 42 of the gate stack S1. Various types of information are displayed on the front panel 50. An anode 52 is formed on the bottom surface of the front panel 50 facing the gate stack S1, while a phosphor layer 54 is formed on a portion of the anode 52, and a black matrix 56 for preventing optical crosstalk is formed on the remaining portion. The phosphor layer 54 has phosphors excited by the electron beams to emit light 55 of red (R), green (G) and blue (B) uniformly distributed. A DC voltage Va is applied to the anode 52.

In FIG. 5, spacers are provided between the front panel 50 and a gate stacks S1, but the spacers are not shown in FIG. 5 for the sake of brevity.

A method of manufacturing a CNT FED according to an embodiment of the present invention will now be described. Specifically, a description of forming the gate stack S1 will follow.

First, steps of stacking and etching material layers applied to a process of forming a gate insulating layer 36 and/or a focus gate insulating layer 40 included in the gate stack S1 will be described in detail with reference to FIGS. 6 through 14.

FIGS. 6 through 14 are cross-sectional views showing sequential steps of stacking and etching oxide layers applied to a process of forming a gate insulating layer included in a gate stack of the field emission display device shown in FIG. 5.

Figure 6:
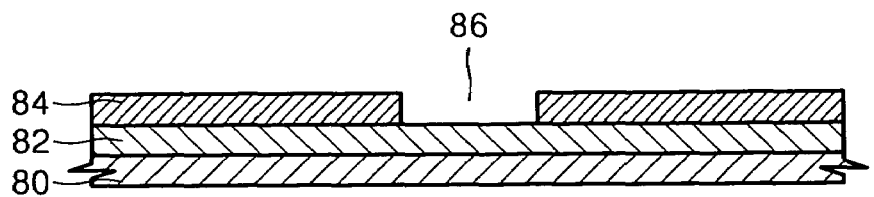
FIGS. 6 through 14 are cross-sectional views showing sequential steps of stacking and etching oxide layers applied to a process of forming a gate insulating layer included in a gate stack of the field emission display device shown in FIG. 5.

Referring to FIG. 6, a first electrode 82 is formed on a substrate 80. The substrate 80 may correspond to the glass substrate 30 of the CNT FED (to be referred to as an FED according to the present invention) shown in FIG. 2. The first electrode 82 corresponds to an ITO transparent electrode 32 of the FED according to the present invention.

A second mask layer 84 is formed on the first electrode 82. Then, a via hole 86, through which the first electrode 82 is exposed, is formed in the second mask layer 84. The second mask layer 84 is formed of a material which is transparent to visible light and opaque to ultraviolet (UV) light, e.g., an amorphous silicon layer. Therefore, the second mask layer 84 corresponds to the first mask layer 34 of the FED according to the present invention.

Figure 7:
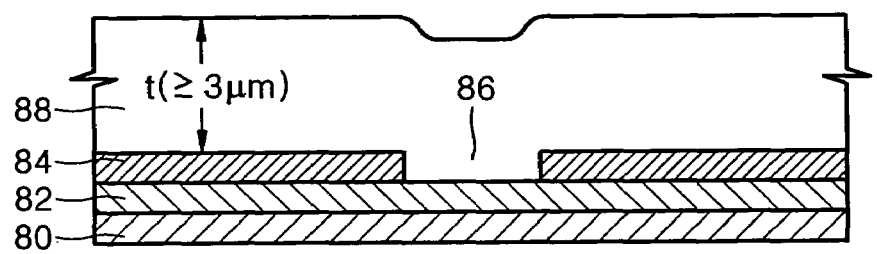

Referring to FIG. 7, an insulating layer 88 is formed on the second mask layer 84 to a predetermined thickness (t) using silicon oxide ($SiO_2$) for filling the hole 86. Here, the insulating layer 88 is formed to a thickness of 2 μm or greater, preferably 3 to 15 μm, most preferably 6 to 15 μm. The insulating layer 88 may be formed by a plasma enhanced chemical vapor deposition (PECVD) technique using RF. However, the technique employed may vary according to the thickness of the insulating layer 88. For example, when the insulating layer 88 is formed so as to be relatively thinly within the above thickness range, sputtering can be employed. When the insulating layer 88 is formed so as to be relatively thick within the above thickness range, electric plating or thermal evaporation can be employed.

Detailed processing conditions for forming the insulating layer 88 using silicon oxide ($SiO_x$) by the PECVD technique are as follows.

During formation of silicon oxide ($SiO_x$), the substrate 80 is maintained at a temperature in a range of about 250° C. to about 450° C., preferably at approximately 340° C. Also, RF power is maintained in a range of 100 to 300 W, preferably about 160 W. The pressure of the reaction chamber is maintained in a range of 600 to 1,200 mTorr, preferably about 900 mTorr. The flow rate of silane ($SiH_4$) as a source gas is preferably maintained such that the deposition rate is greater than 400 nm/min. For example, the flow rate of the silane is maintained at 50 to 700 sccm, preferably approximately 300 sccm, which is much higher than that for forming general silicon oxide ($SiO_2$), which is approximately 15 sccm. Another source gas nitric acid ($N_2O$) is preferably supplied at a flow rate in a range of 700 to 4,500 sccm, preferably 1,000 to 3,000 sccm.

Figure 15:
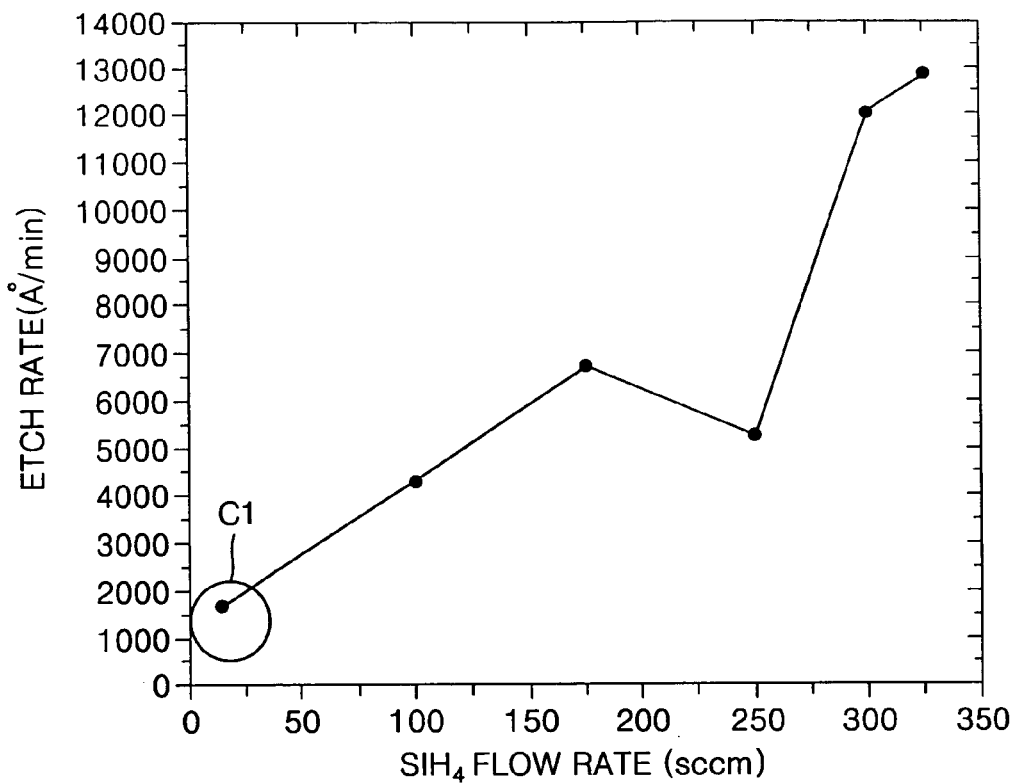
FIG. 15 is a graph showing an etch rate depending on a flow rate of silane ($SiH_4$) contained in a focus gate insulating layer included in the gate stack of the field emission display device shown in FIG. 5.

The flow rate of silane defined above can also be applied to an etching process of silicon oxide ($SiO_x$) by the PECVD technique. In this case, as shown in FIG. 15, in the silane flow rate range defined above, the etch rate of silicon oxide ($SiO_x$) is much higher than the etch rate C1 of the conventional case. During etching, the silane flow rate is preferably maintained such that the etch rate of the silicon oxide ($SiO_x$) is greater than 100 nm/min.

Figure 16:
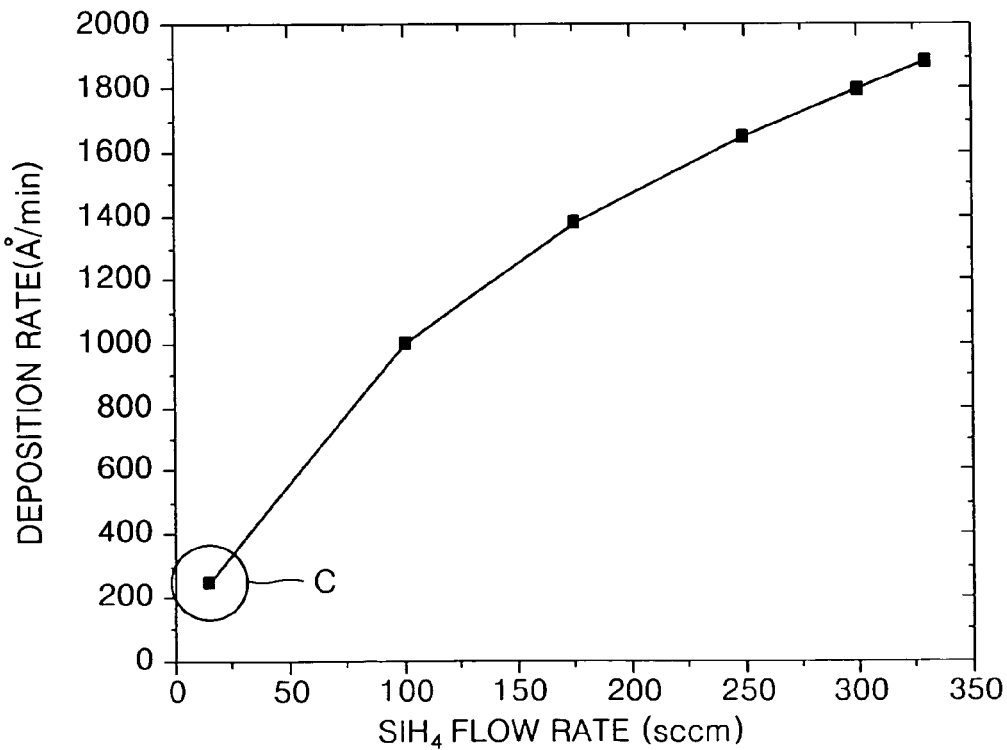
FIG. 16 is a graph showing a deposition rate depending on a flow rate of silane ($SiH_4$) contained in a focus gate insulating layer included in the gate stack of the field emission display device shown in FIG. 5.

When silicon oxide ($SiO_x$) is formed under the above-described processing conditions, it can be formed to a thickness within the thickness range defined above. Thus, a better step coverage than that of the prior art can be attained. According to the present invention, as shown in FIG. 16, the deposition rate (Å/min) is much higher than the deposition rate C of the prior art.

Figure 8:
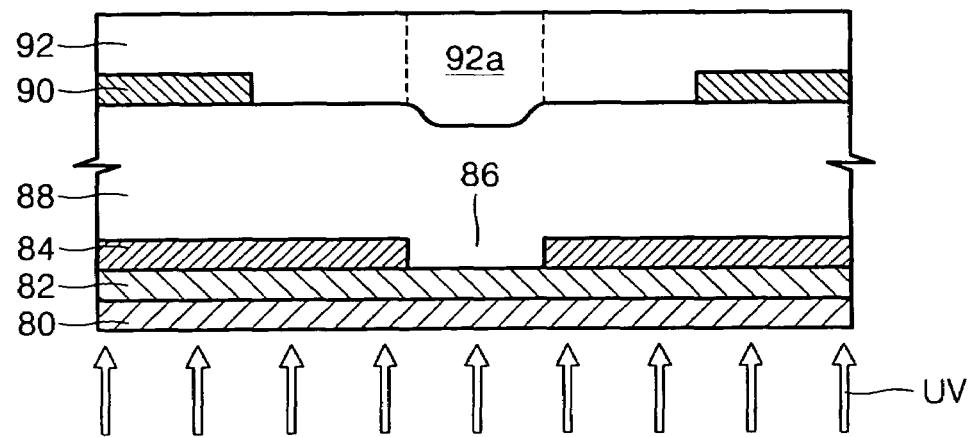

Referring to FIG. 8, a second electrode 90 is formed on the insulating layer 88. The second electrode 90 can be a chrome electrode. The second electrode 90 may correspond to the focus gate electrode 42 included in the gate stack S1 of the FED according to the present invention. A first photoresist layer 92 covering the second electrode 90 is formed on the insulating layer 88. The first photoresist layer 92 is, preferably, formed of a positive photoresist layer. After forming the first photoresist layer 92, UV light is irradiated upward to the substrate 80, which is referred to as back exposure. Due to a UV masking property of the mask layer 84, a region of second mask layer 84 other than via hole 86 is not exposed to UV light during the back exposure. The UV light irradiated through the via hole 86 passes through the insulating layer 88, and a region 92a (to be referred to as an exposed area, hereinafter) corresponding to the via hole 86 of the first photoresist layer 92 is exposed to the UV light. Thereafter, a developing process is performed. The exposed area 92a of the first photoresist layer 92 is removed during the developing process. Then, a predetermined baking process is performed.

Figure 9:
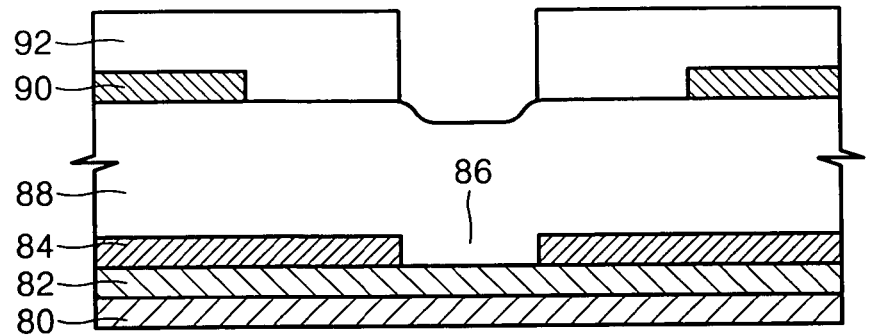

FIG. 9 shows a product resulting from the developing process and the baking process. As shown in FIG. 9, the insulating layer 88 is exposed through a portion created by removing the exposed area 92a.

Figure 10:
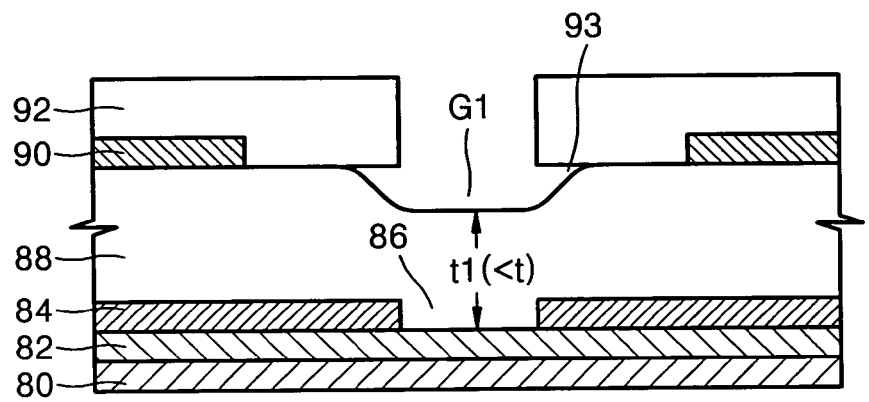

Referring to FIG. 10, the insulating layer 88 is primarily etched using the first photoresist layer 92 that partially exposes the insulating layer 88 as an etch mask. The primary etching is a wet etching process using a predetermined etchant, and is carried out for a predetermined period of time. A first groove G1 having a predetermined depth is formed at the exposed portion of the insulating layer 88 by the primary etching process. A thickness t1 of a portion where the first groove G1 of the insulating layer 88 is formed is smaller than a thickness t of a portion of the insulating layer 88 which is not affected by the primary etching. The first groove G1 extends to a lower portion of the first photoresist layer 92 due to an isotropic feature of the wet etching process. Accordingly, a first undercut 93 is formed under the first photoresist layer 92. After the primary etching, the first photoresist layer 92 is removed.

Figure 11:
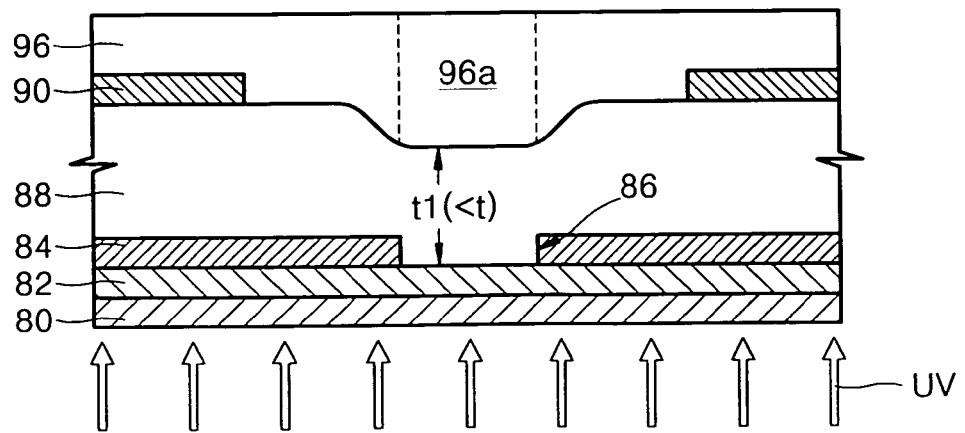

Referring to FIG. 11, after removing the first photoresist layer 92, a second photoresist layer 96 covering the second electrode 90 is formed on the insulating layer 88 having the first groove G1 formed therein. The second photoresist layer 96 is formed of a positive photoresist layer like the first photoresist layer 92. After forming the second photoresist layer 96, secondary back exposure is performed. During the secondary back exposure, a region 96a corresponding to the hole 86 of the second photoresist layer 96 is exposed. Thereafter, a developing process is performed to remove the exposed area 96a, followed by baking the resultant structure.

Figure 12:
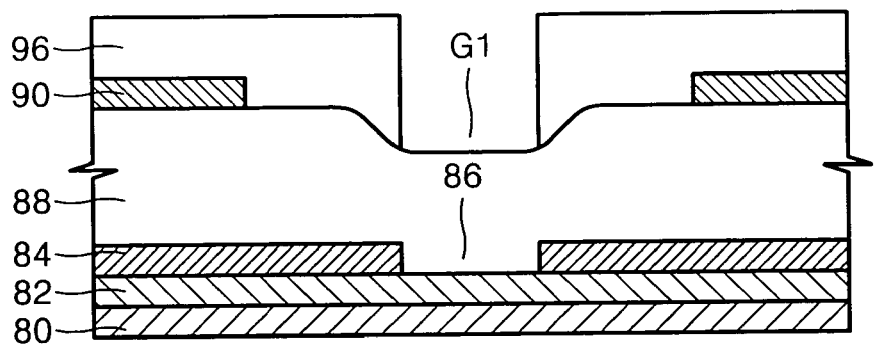
Figure 13:
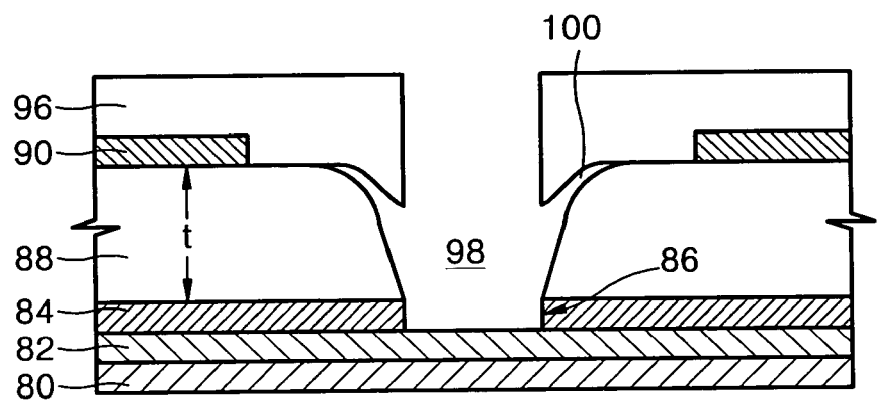

FIG. 12 shows a resultant structure produced after baking the second photoresist layer 96. The first groove G1 is partially exposed through a portion created by removing the exposed area 96a of the second photoresist layer 96. In this state, the insulating layer 88 having the first groove G1 is secondarily etched using the second photoresist layer 96 as an etch mask. The secondary etching is a wet etching process using a predetermined etchant. The secondary etching is carried out until the first electrode 82 is exposed, as shown in FIG. 13. During the secondary etching, a via hole 98, through which a predetermined region of the first electrode 82 is exposed, is formed in the insulating layer 88. The via hole 98 extends to a lower portion of the second photoresist layer 96 due to wet etching. As a result, a second undercut 100 is formed under the second photoresist layer 96. After the secondary etching, the second photoresist layer 96 is washed and stripped so as to be removed. Then, a predetermined washing step is performed, followed by drying.

Figure 14:
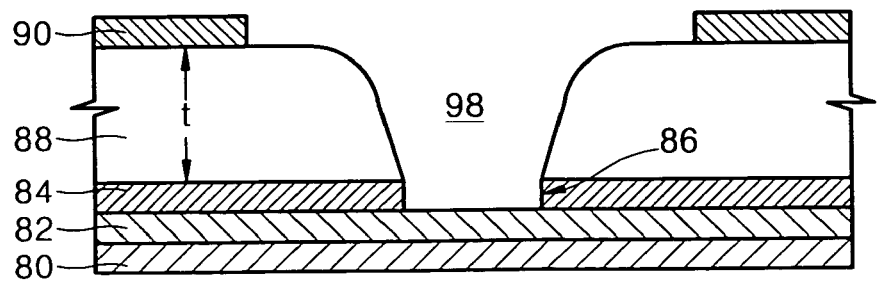

FIG. 14 shows a resultant product after the washing and drying. Referring to FIG. 14, the via hole 98 exposing the first electrode 82 is formed in the insulating layer 88. Alternatively, instead of the back exposure, front exposure may be employed to etch the insulating layer 88, that is, UV light is irradiated downward into the photoresist layer, which is illustrated in FIG. 17.

Figure 17:
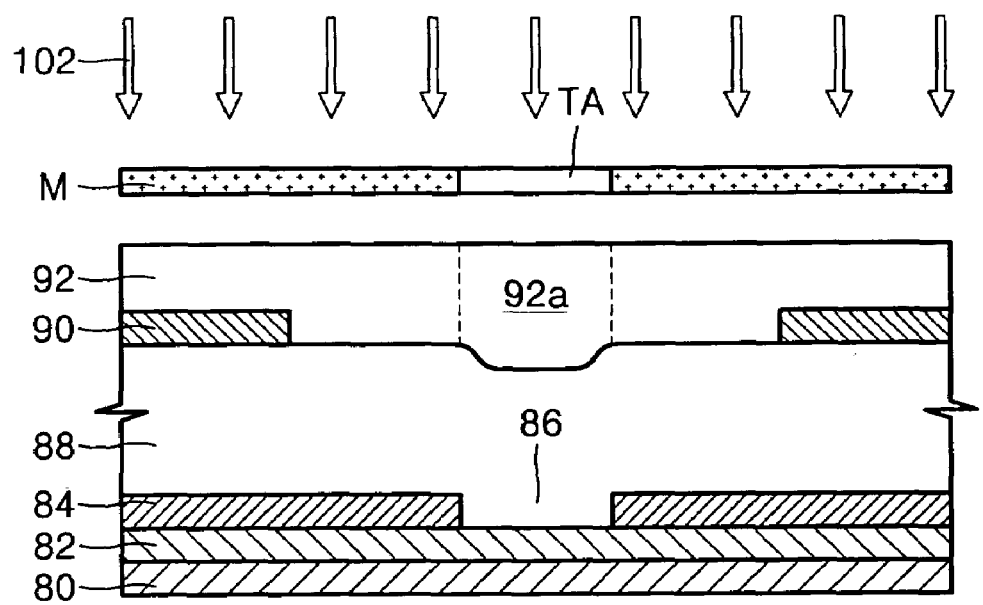
FIG. 17 is a cross-sectional view showing a method of exposing a photoresist layer different from the exposing method for stacking and etching oxide layers shown in FIGS. 6 through 14.

FIG. 15 is a graph showing an etch rate depending on a flow rate of silane ($SiH_4$) contained in a focus gate insulating layer included in the gate stack of the field emission display device shown in FIG. 5, FIG. 16 is a graph showing a deposition rate depending on a flow rate of silane ($SiH_4$) contained in a focus gate insulating layer included in the gate stack of the field emission display device shown in FIG. 5, while FIG. 17 is a cross-sectional view showing a method of exposing a photoresist layer different from the exposing method for stacking and etching oxide layers shown in FIGS. 6 thru 14.

Referring to FIG. 17, a mask M is placed above at a position spaced apart from the first photoresist layer 92 by a given gap, the mask M having a transmission aperture only at a location corresponding to the hole 86 and shielding the remaining region. Subsequently, light 102 is irradiated downward into the mask M. Some of the light 102 irradiated into the mask M is irradiated into the first photoresist layer 92 through the transmission aperture TA formed in the mask M. Accordingly, a predetermined region 92a of the first photoresist layer 92 is exposed. Then, the mask M is removed. The developing, washing and baking processes of the first photoresist layer 92, and the wet etching using the first photoresist layer 92 as an etch mask, are the same as described above.

A method for manufacturing a CNT FED shown in FIG. 5, to which the above-described depositing and etching processes of the insulating layer 88 are applied, will now be described.

FIGS. 18 through 30 are cross-sectional views showing sequential steps of forming a gate stack and a carbon nanotube emitter in the method for manufacturing a field emission display device shown in FIG. 5.

Figure 18:
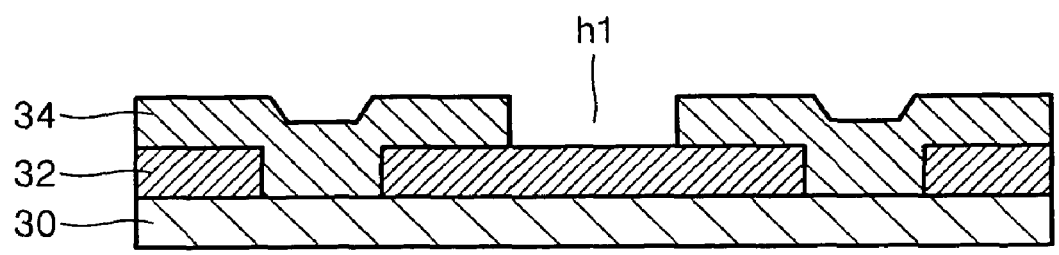
FIGS. 18 through 30 are cross-sectional views showing sequential steps of forming a gate stack and a carbon nanotube emitter in the method for manufacturing a field emission display device shown in FIG. 5.

Referring to FIG. 18, a transparent electrode 32 is formed on a glass substrate 30. The transparent electrode 32 is preferably formed of an ITO electrode, but another equivalent electrode may also be used. A first mask layer 34 for back exposure is formed on the glass substrate 30 and covers the transparent electrode 32. The first mask layer 34 is preferably a material which is transparent with respect to visible light while being opaque with respect to UV light. For example, an amorphous silicon layer may be used as the first mask layer 34. A first via hole h1, through which the transparent electrode 32 is partially exposed, is formed in the first mask layer 34.

Figure 19:
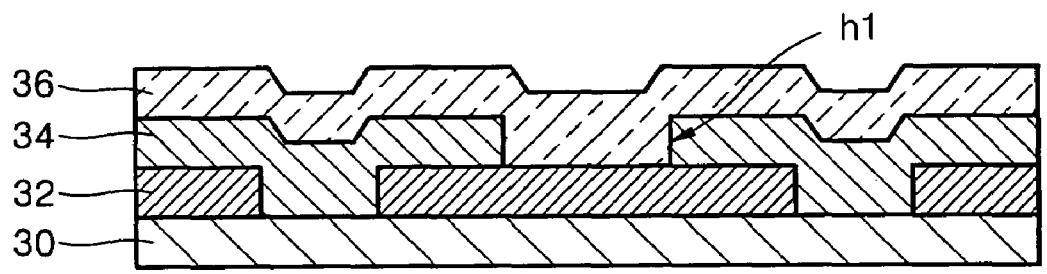

Referring to FIG. 19, a gate insulating layer 36 filling the first via hole hi is formed on the first mask layer 34. The gate insulating layer 36 is formed of silicon oxide having a thickness of about 1 to 5 μm.

Figure 20:
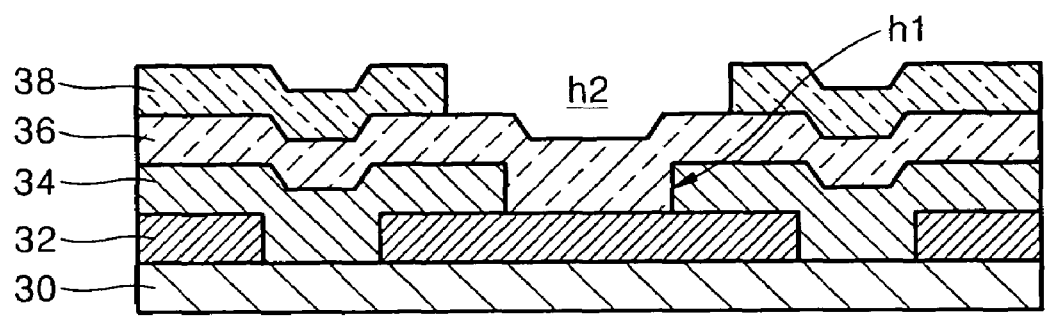

Referring to FIG. 20, an insulating layer 38 is formed on the gate insulating layer 36. The gate electrode 38 can be a chrome electrode, and is formed to a thickness of approximately 0.25 μm. The gate electrode 38 is patterned to form a second via hole h2 therein. At least a portion of the gate insulating layer 36 filling the first via hole h1 is exposed through the second via hole h2. The diameter of the second via hole h2 is larger than that of the first via hole h1.

Figure 21:
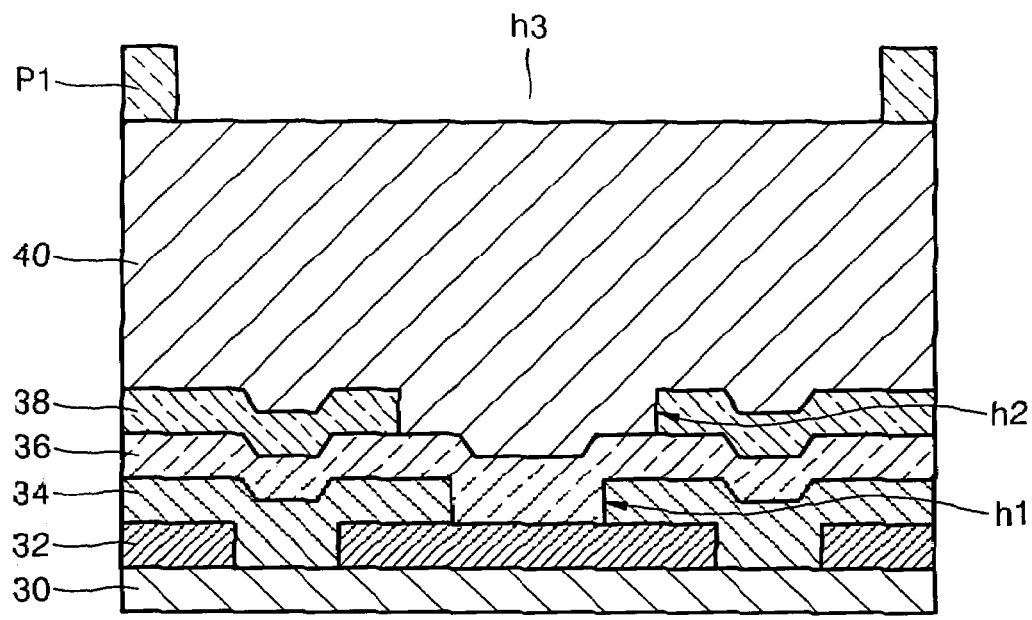

Referring to FIG. 21, a focus gate insulating layer 40 filling the second via hole h2 is formed on the gate electrode 38. The focus gate insulating layer 40 can be formed by the same method as is used to form the insulating layer 88 shown in FIGS. 6 through 14. Accordingly, the focus gate insulating layer 40 can be formed to a thickness of not less than 2 μm, preferably 3 to 15 μm, most preferably 6 to 15 μm.

Referring back to FIG. 21, a first photoresist layer P1 is coated on the focus gate insulating layer 40, and is then patterned to form a third via hole h3 corresponding to the first via hole h1 and second via hole h2, and having a diameter larger than that of the second via hole h2.

Figure 22:
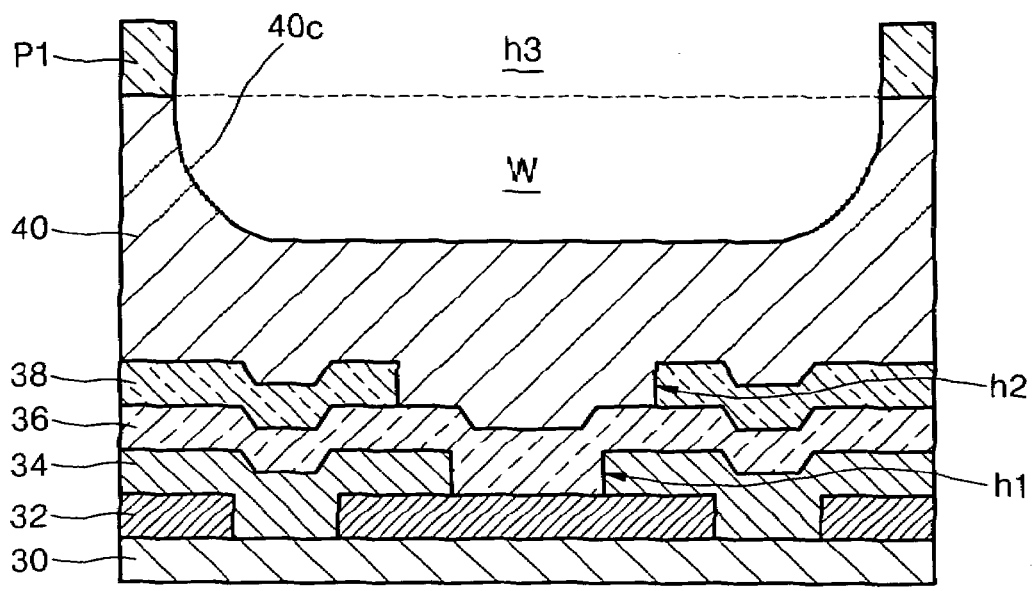

Referring to FIG. 22, the focus gate insulating layer 40 is wet etched with a predetermined etchant to a predetermined depth using the patterned first photoresist layer P1 as a mask to form a well W. Then, the first photoresist layer P1 is removed. Here, a second inclined plane 40c is formed on one side of the well W, and a portion corresponding to the horizontal portion 40b shown in FIG. 5 is formed at a bottom of the well W.

Figure 23:
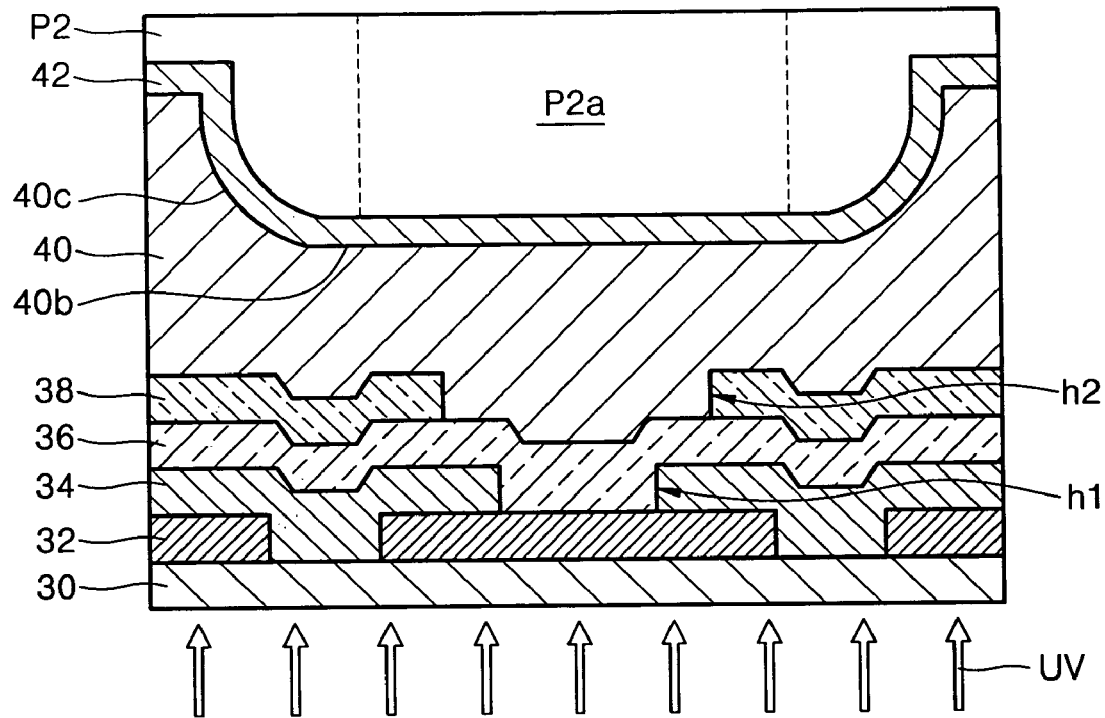

Referring to FIG. 23, a focus gate electrode 42 is formed on the focus gate insulating layer 40. The focus gate electrode 42 can be a chrome electrode.

Referring again to FIG. 23, a second photoresist layer P2 filling the well W is coated on the focus gate electrode 42. Then, UV light is irradiated to a bottom surface of the glass substrate 30, which is referred to as back exposure. The UV light is incident into the second photoresist layer P2 via the the transparent electrode 32, the first via hole h1, the gate insulating layer 36, and the focus gate insulating layer 40. The UV light incident into a portion other than the first via hole h1 is masked by the first mask layer 34 for back exposure. Thus, only a portion of the second photoresist layer P2 positioned above the first via hole h1 is exposed to the UV light. Here, overetching is performed to make an exposed area P2a of the second photoresist layer P2 wider than the second via hole h2, as shown in FIG. 23. Next, the exposed area P2a is removed by a developing process. The focus gate electrode 42 is partially exposed through a portion created by removing the exposed area P2a. Then, the exposed portion of the focus gate electrode 42 is wet etched using the second photoresist layer P2 as an etch mask.

Figure 24:
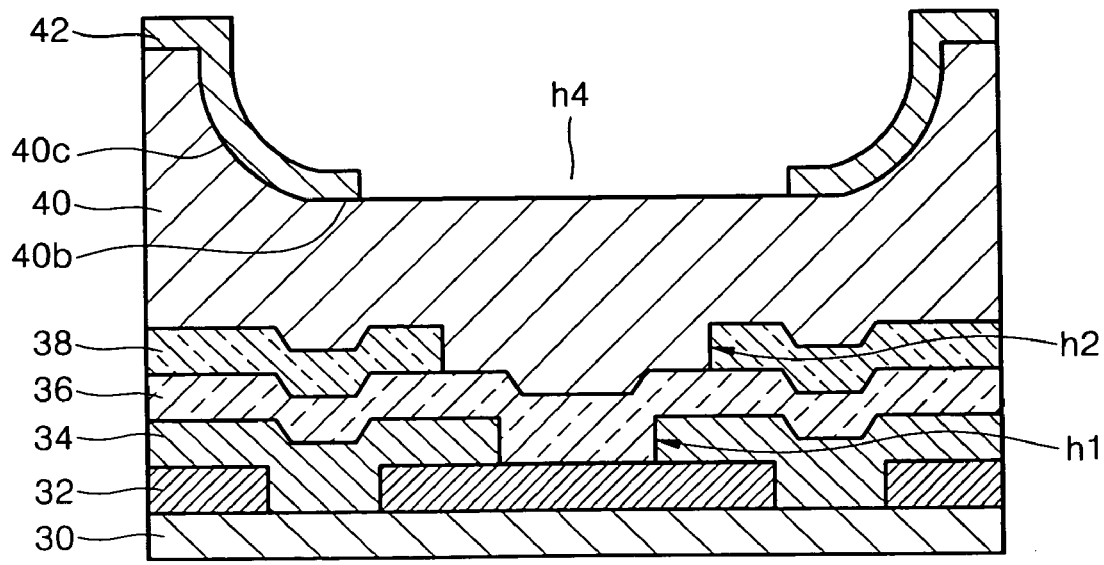

FIG. 24 is a sectional view showing a state after removing the exposed area of the focus gate electrode 42 through the second photoresist layer P2 by wet etching and then removing the second photoresist layer P2.

Referring to FIG. 24, a fourth via hole h4 is formed at a portion created after removing the exposed area of the focus gate electrode 42, and the focus gate electrode 42 is formed on the second inclined plane 40c and horizontal portion 40b of the focus gate insulating layer 40.

Figure 25:
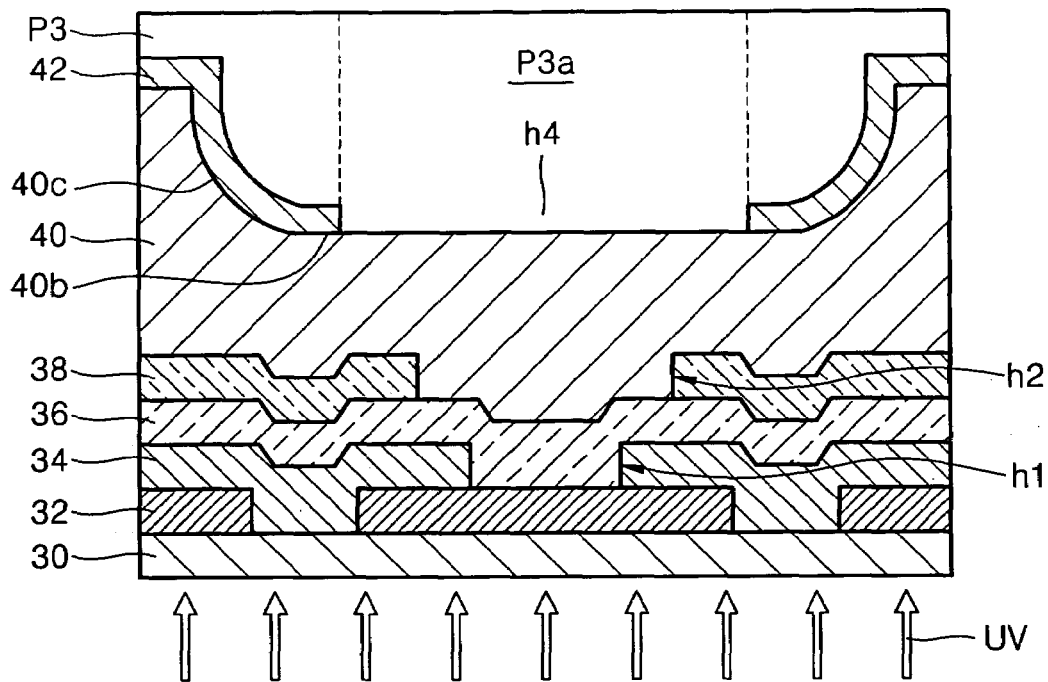
Figure 26:
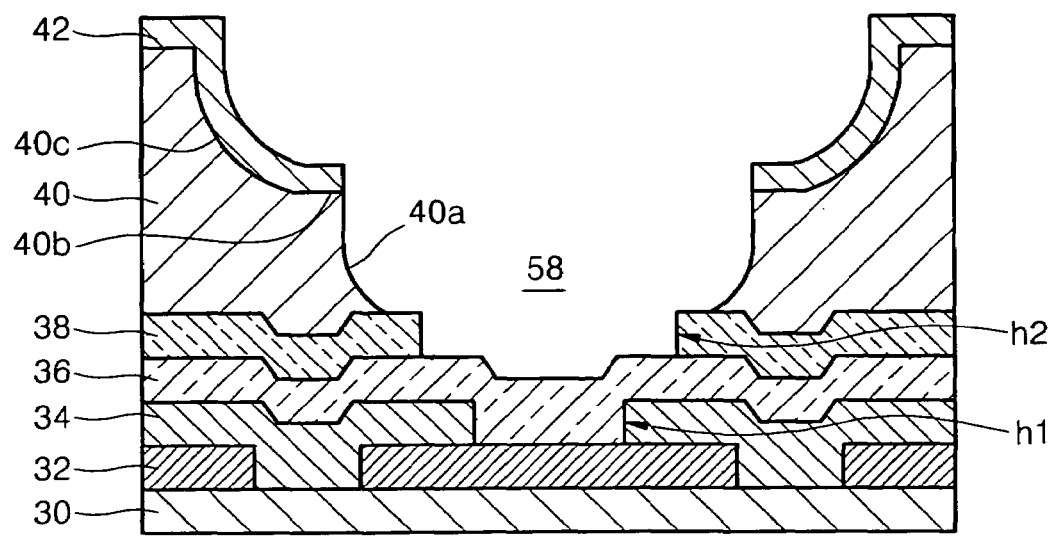

FIGS. 25 and 26 show a process for partially removing the focus gate insulating layer 40 exposed through the fourth via hole h4. This step is similar to the removing step of the focus gate electrode 42 shown in FIGS. 23 and 24. That is, the fourth via hole h4 and focus gate electrode 42 are covered with a third photoresist layer P3 (which is the same as the second photoresist layer P2 of FIG. 23) disposed on the focus gate insulating layer 40, followed by performing back exposure to form an exposed area P3a, and then the exposed area P3a is removed by a developing process.

Next, the focus gate insulating layer 40 is partially removed by wet etching using the exposed area P3a as a mask, thereby forming a groove 58 to expose the gate insulating layer 36 (see FIG. 26). At this time, the first inclined plane 40a shown in FIG. 5 is formed.

Figure 27:
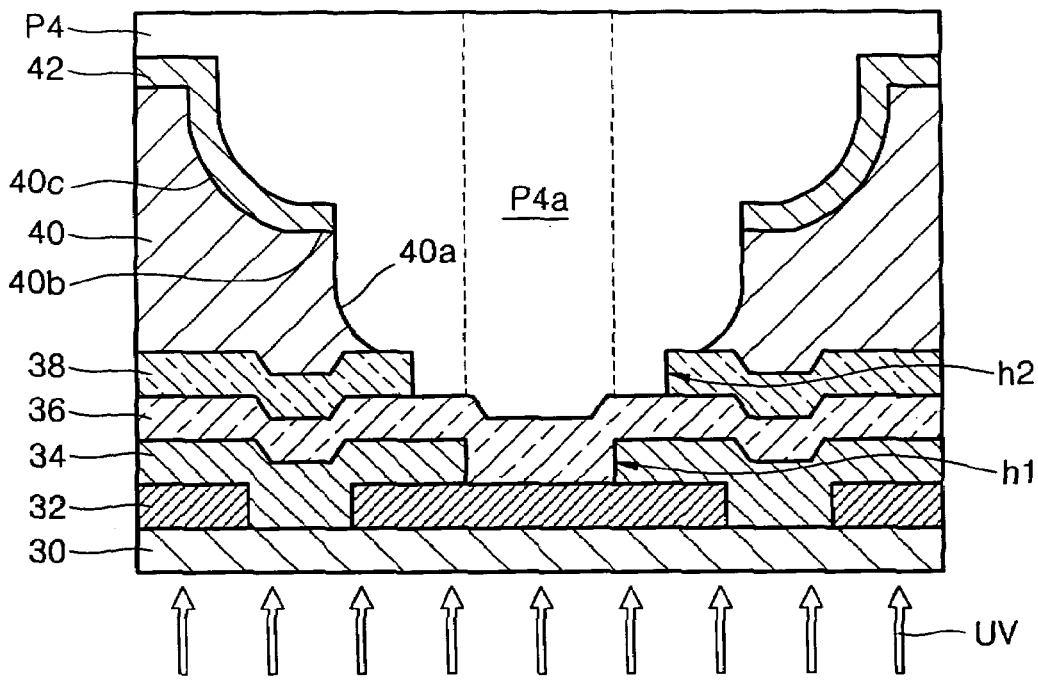

Referring to FIG. 27, a fourth photoresist layer P4 covering the groove 58 is coated on the exposed gate insulating layer 36, and back exposure and development are then performed to remove an exposed area P4a, thereby patterning the fourth photoresist layer P4.

Figure 28:
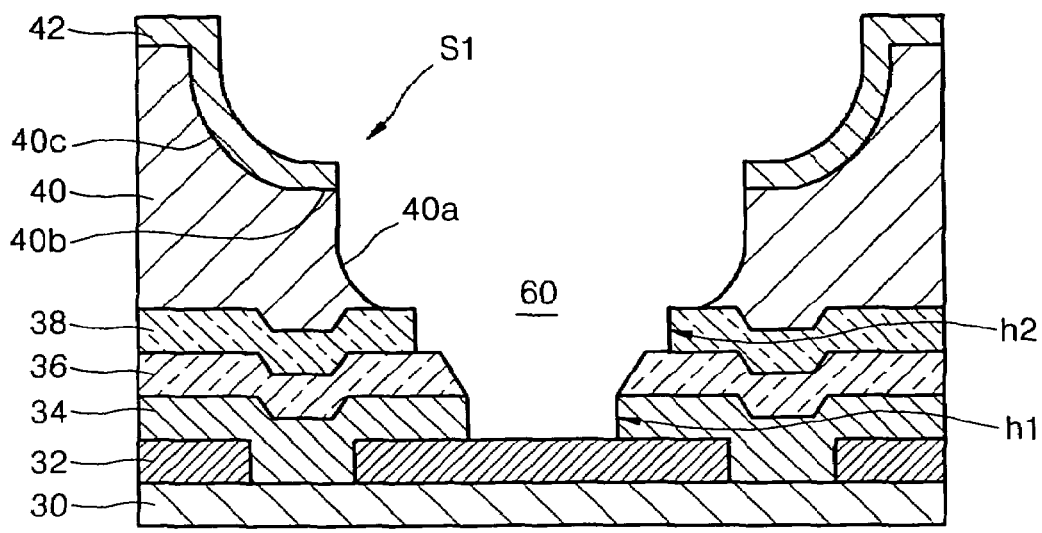

Subsequently, the gate insulating layer 36 is patterned by wet etching. FIG. 28 shows the product created after removing the fourth photoresist layer P4. Then, a hole 60, through which at least the transparent electrode 32 is exposed, is formed in the gate stack S1 consisting of the first mask layer 34, the gate insulating layer 36, the gate electrode 38, the focus gate insulating layer 40 and the focus gate electrode 42. The hole 60 corresponds to the hole 44 shown in FIG. 5.

Figure 29:
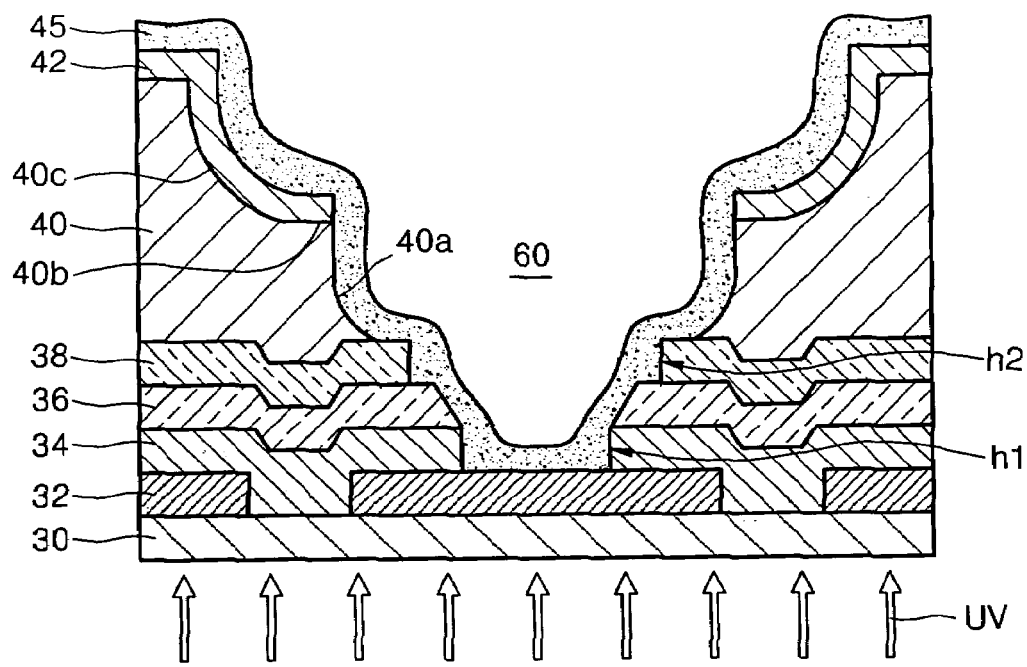
Figure 30:
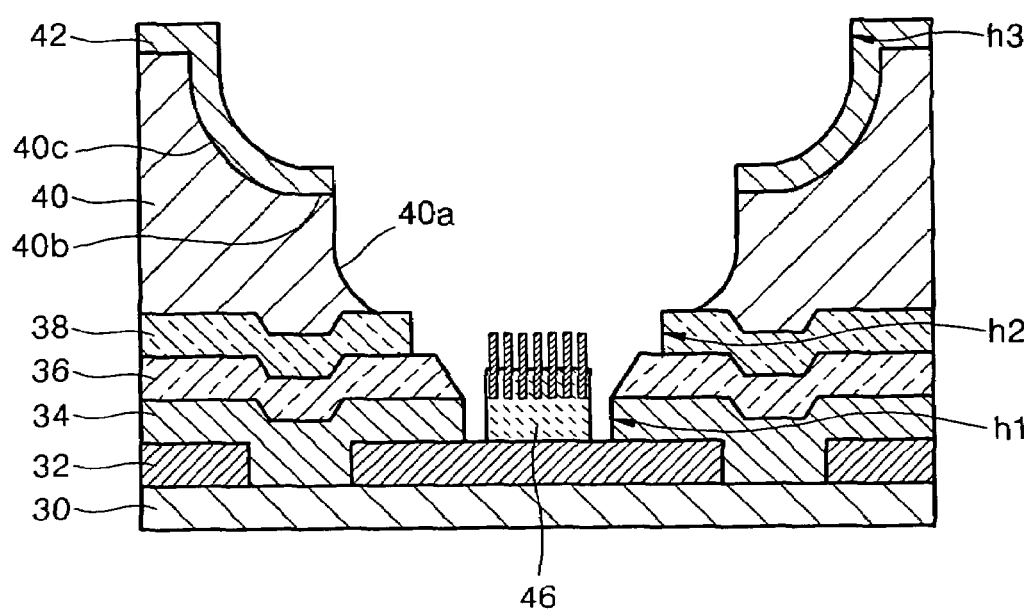

As shown in FIG. 29, a CNT paste 45 containing a negative photosensitive material is coated on the transparent electrode 32 exposed through the hole 60, and the photosensitive CNT paste 45 is subjected to back exposure. Then, developing and baking steps are performed, thereby forming a CNT emitter 46 on emitter electrode 32, as shown in FIG. 30.

Subsequent steps for forming the CNT FED are the same as in the conventional process.

Figure 31:
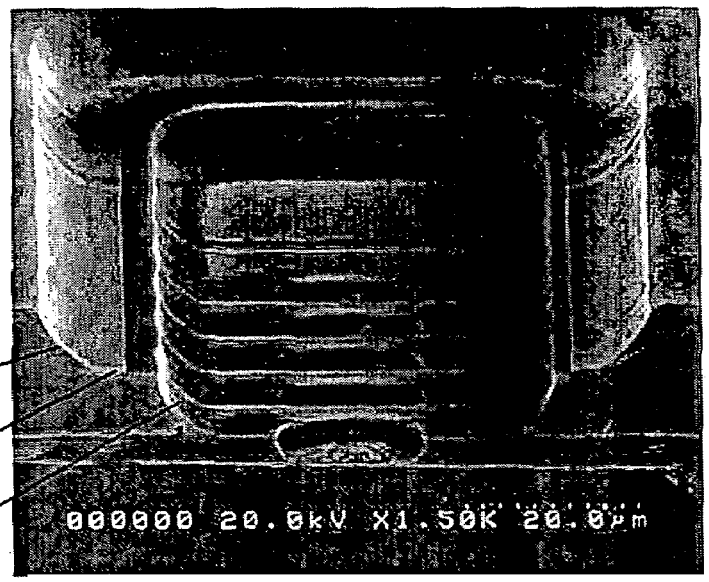
FIGS. 31 and 32 are SEM photos of field emission devices manufactured according to embodiments of the present invention.
Figure 32:
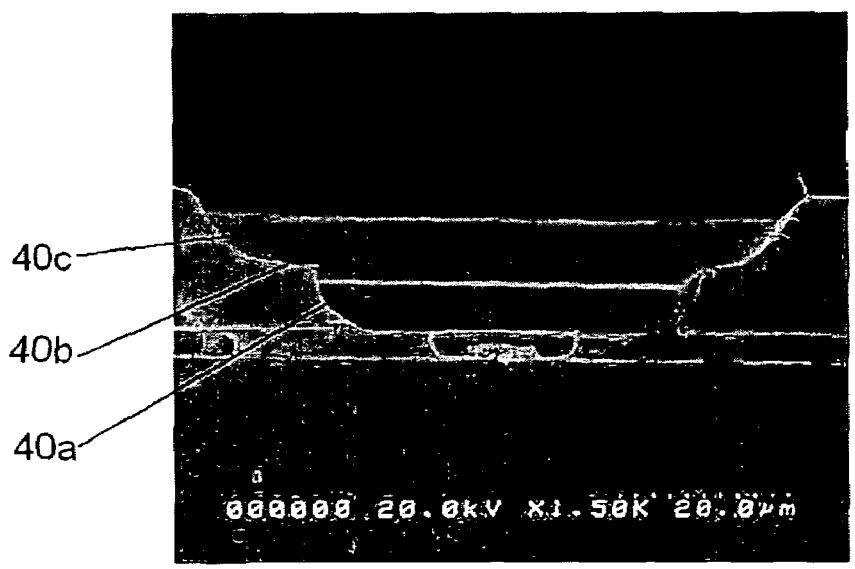

FIGS. 31 and 32 are SEM photos of field emission devices manufactured according to embodiments of the present invention.

Referring to FIGS. 31 and 32, a focus gate insulator structure includes a first inclined portion 40a, a second horizontal portion 40b and a second inclined portion 40c from the viewpoint of a cross section.

Figure 33:
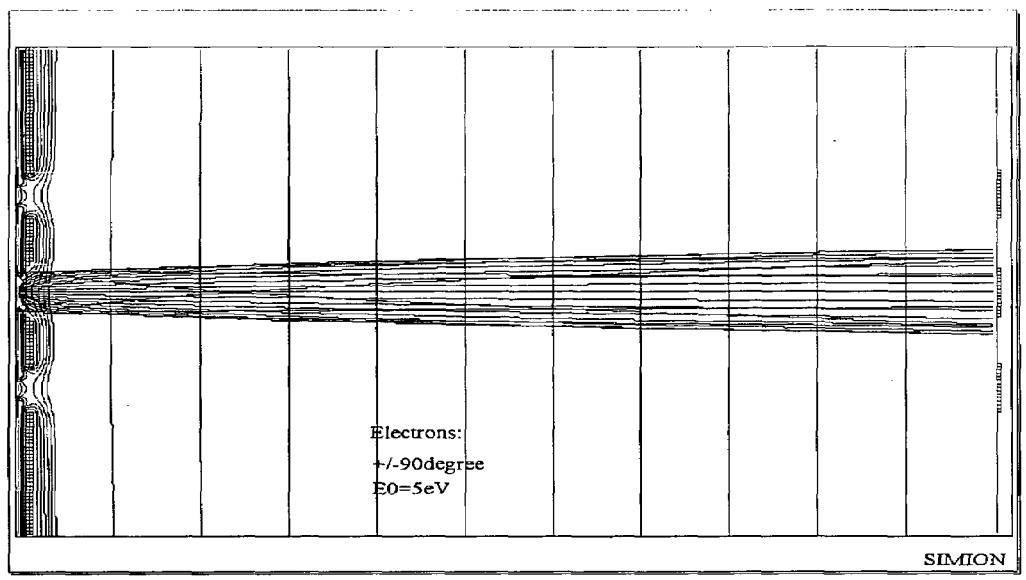
FIGS. 33 and 34 show results of a computer simulation performed with respect to trajectories of electron beams emitted from emitters of the FED according to the present invention.
Figure 34:
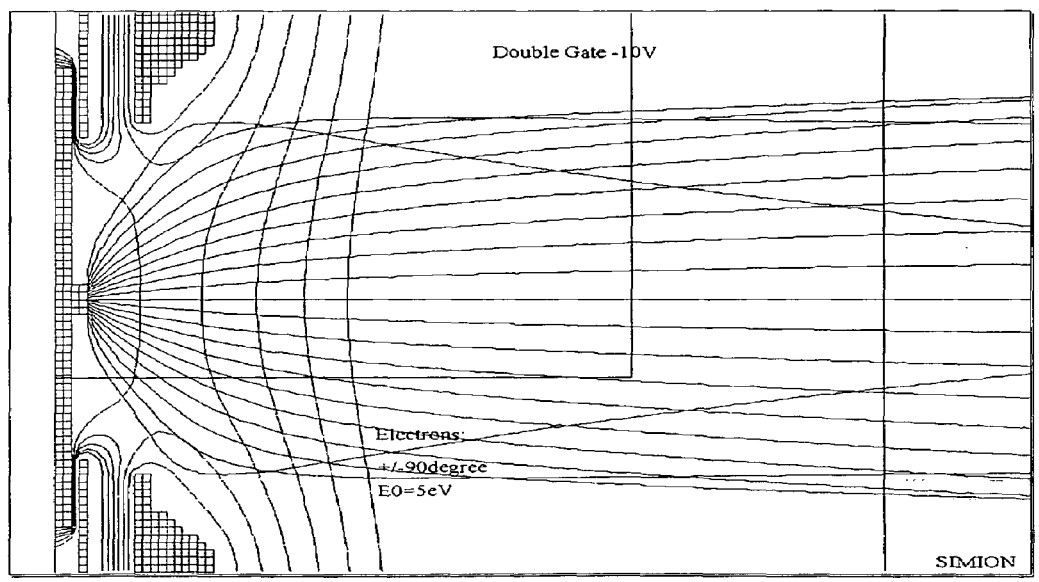

FIGS. 33 and 34 show the results of a computer simulation performed with respect to trajectories of electron beams emitted from emitters of the FED according to the present invention.

Referring to FIGS. 33 and 34, electrons emitted from the CNT emitter travel toward a phosphor layer facing the CNT emitter with a directionality.

As described above, in the CNT FED according to the present invention, since the focus gate electrode is formed on an inclined plane of the focus gate insulating layer, electron beams dispersing at a wide angle can be effectively focused, thereby realizing high color purity.

In terms of the manufacturing process, a mask layer that defines a transparent electrode region, in which a CNT emitter is to be formed, is formed between a transparent electrode and a gate insulating layer, and UV light is irradiated upward from the lower portion of the transparent electrode, thereby patterning a photoresist layer coated on the region where the CNT emitter is to be formed. Since a to-be-exposed area of the photoresist layer is determined by the mask layer, a separate mask for defining the to-be-exposed area of the photoresist layer is not required. That is, the to-be-exposed area of the photoresist layer is determined in a self-aligned manner by the mask layer. Therefore, the manufacturing process can be simplified. Also, since it is not necessary to form a separate mask, the manufacturing cost of the CNT FED can be reduced. Further, a large-area CNT FED can be manufactured using a general semiconductor technique without separate special equipment.

While the present invention has been particularly shown and described with reference to preferred embodiments thereof, it will be understood by those of ordinary skill in the art that various changes in form and detail may be made therein without departing from the spirit and scope of the present invention as defined by the following claims and their equivalents.

What is claimed is:

1. A field emission device having a glass substrate, an emitter electrode formed on the glass substrate, a carbon nanotube (CNT) emitter formed on the emitter electrode, and a gate stack formed around the CNT emitter for extracting electron beams from the CNT emitter and focusing the extracted electron beams onto a given position, wherein the gate stack comprises:
   a mask layer covering the emitter electrode and disposed around the CNT emitter;
   a gate insulating layer and a gate electrode sequentially formed on the mask layer;
   a focus gate insulating layer disposed on the gate electrode and having double inclined planes facing the CNT emitter; and
   a focus gate electrode coated on the focus gate insulating layer.

2. The field emission device of claim 1, wherein the focus gate insulating layer comprises a first inclined plane connected to the gate electrode, and a second inclined plane inclined upward from the first inclined plane, wherein an inclination angle of the first inclined plane is greater than an inclination angie of the second inclined plane.

3. The field emission device of claim 2, wherein the focus gate electrode is formed upward from the second inclined plane.

4. The field emission device of claim 2, wherein the focus gate insulating layer further comprises a horizontal portion disposed between the first inclined plane and the second inclined plane and having a predetermined length.

5. The field emission device of claim 4, wherein the focus gate electrode is formed upward from the horizontal portion.

6. The field emission device of claim 2, wherein at least one of the first and second inclined planes is concavely formed.

7. The field emission device of claim 1, wherein the emitter electrode comprises a transparent electrode, and the mask layer comprises an amorphous silicon layer.

8. A field emission display device having a glass substrate, an emitter electrode formed on the giass substrate, a carbon nanotube (CNT) emitter formed on the emitter electrode, a gate stack formed around the CNT emitter for extracting electron beams from the CNT emitter and focusing the extracted electron beams onto a given position, a front panel formed above the gate stack for displaying information, and a phosphor layer coated on a surface of the front panel facing the CNT emitter, wherein the gate stack comprises:
   a mask layer covering the emitter electrode and disposed around the CNT emitter;
   a gate insulating layer and a gate electrode sequentially formed on the mask layer;
   a focus gate insulating layer disposed on the gate electrode and having double inclined planes facing the CNT emitter; and
   a focus gate electrode coated on the focus gate insulating layer.

9. The field emission display device of claim 8, wherein the focus gate insulating layer comprises a first inclined plane connected to the gate electrode, and a second inclined plane inclined upward from the first inclined plane, wherein an inclination angle of the first inclined plane is greater than an inclination angle of the second inclined plane.

10. The field emission display device of claim 9, wherein the focus gate electrode is formed upward from the second inclined plane.

11. The field emission display device of claim 9, wherein the focus gate insulating layer further comprises a horizontal portion disposed between the first inclined plane and the second inclined plane and having a predetermined length.

12. The field emission display device of claim 11, wherein the focus gate electrode is formed upward from the horizontal portion.

13. The field emission display device of claim 9, wherein at least one of the first and second inclined planes is concavely formed.

14. The field emission display device of claim 8, wherein the emitter electrode comprises a transparent electrode, and the mask layer comprises an amorphous silicon layer.

15. A method of manufacturing a field emission device, comprising the steps of proving a glass substrate, forming a transparent electrode on the glass substrate, forming a carbon nanotube (CNT) emitter on the emitter electrode, and forming a gate stack around the CNT emitter for extracting electron beams from the CNT emitter and focusing the extracted electron beams onto a given position, wherein the step of forming the gate stack comprises:
   (a) forming a mask layer on the glass substrate to partially expose the transparent electrode through a via hole;
   (b) forming a gate insulating layer on the mask layer to fill the via hole;
   (c) forming a gate electrode on the gate insulating layer around the via hole;
   (d) forming a focus gate insulating layer on the gate electrode;
   (e) forming a well on the focus gate insulating layer around the via hole;
   (f) forming a focus gate electrode on the focus gate insulating layer around the via hole; and
   (g) removing the focus gate insulating layer within the gate electrode; and
   (h) removing the gate insulating layer within the gate electrode.

16. The method of claim 15, wherein the step (e) of forming the well comprises:
   depositing a photoresist layer on the focus gate insulating layer;
   exposing the photoresist layer formed over the via hole;
   removing the exposed portion of the photoresist layer;
   forming the well to a predetermined depth by wet etching the focus gate insulating layer using the photoresist layer having the exposed portion removed therefrom as an etch mask; and
   removing the photoresist layer.

17. The method of claim 16, wherein the step of exposing the photoresist layer comprises exposing the photoresist layer by irradiating ultraviolet (UV) light from a bottom of the glass substrate.

18. The method of claim 16, wherein the step (f) of forming the focus gate electrode comprises:
   forming the focus gate electrode on the well;
   coating a photoresist layer onto the focus gate electrode;
   exposing the photoresist layer formed over the via hole;
   removing the exposed portion of the photoresist layer;
   wet etching the focus gate electrode using the photoresist layer having the exposed portion removed therefrom as an etch mask; and
   removing the photoresist layer.

19. The method of claim 18, wherein the step of exposing the photoresist layer comprises exposing the photoresist layer by irradiating ultraviolet (UV) light from a bottom of the glass substrate.

20. The method of claim 18, wherein the step (g) of removing the focus gate insulating layer comprises:
   coating a photoresist layer on the focus gate electrode and the focus gate insulating layer within the focus gate electrode;
   exposing a portion of the photoresist layer formed within the focus gate electrode;
   removing the exposed portion of the photoresist layer;
   wet etching the focus gate insulating layer using the photoresist layer having the exposed portion removed therefrom as an etch mask; and
   removing the photoresist layer.

21. The method of claim 20, wherein the step of exposing the photoresist layer comprises exposing the photoresist layer by irradiating ultraviolet (UV) light from a bottom of the glass substrate.

22. The method of claim 20, wherein the step (h) of removing the gate insulating layer comprises:
   coating a photoresist layer on a structure resulting from removal of the focus gate insulating layer within the gate electrode in step (g);
   exposing a portion of the photoresist layer fonned over the via hole;
   removing the exposed portion of the photoresist layer;
   wet etching the gate insulation layer using the phtoresist layer having the exposed portion removed therefrom as an etch mask; and
   removing the photoresist layer.

23. The method of claim 22, wherein the step of exposing the photoresist layer comprises exposing the photoresist layer by irradiating ultraviolet (UV) light from a bottom of the glass substrate.

24. The method of claim 15, wherein the CNT emitter is formed on an exposed area of the emitter electrode through the via hole after forming the gate stack.

25. The method of claim 15, wherein the step of forming the CNT emitter comprises:
   coating a CNT paste containing a negative photosensitive material covering the via hole on a resultant structure created after removing the focus gate insulating layer and removing the gate insulating layer;
   exposing the CNT paste over the via hole; and
   removing the CNT paste except for the exposed CNT paste.

26. The method of claim 25, wherein the step of exposing the CNT paste comprises exposing the CNT paste by irradiating ultraviolet (UV) light from a bottom of the glass substrate.

27. The field emission display device of claim 1, comprised of forming the gate stack by:
   forming the mask layer on the glass substrate to partially expose the transparent electrode through a via hole;
   forming the gate insulating layer on the mask layer to fill the via hole;
   forming the gate electrode on the gate insulating layer around the via hole;
   forming a focus gate insulating layer on the gate electrode;
   forming a well on the focus gate insulating layer around the via hole;
   forming the focus gate electrode on the focus gate insulating layer around the via hole; and
   removing the focus gate insulating layer within the gate electrode; and
   removing the gate insulating layer within the gate electrode.

* * * * *